(12) United States Patent
Yanagita et al.

(10) Patent No.: US 8,816,617 B2
(45) Date of Patent: Aug. 26, 2014

(54) THREE-PHASE MOTOR CONTROLLER, THREE-PHASE MOTOR SYSTEM, THREE-PHASE MOTOR CONTROL METHOD AND PROGRAM

(75) Inventors: Yoshiho Yanagita, Tokyo (JP); Kazuhiko Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 532 days.

(21) Appl. No.: 13/255,146

(22) PCT Filed: Mar. 9, 2010

(86) PCT No.: PCT/JP2010/053848
§ 371 (c)(1),
(2), (4) Date: Sep. 7, 2011

(87) PCT Pub. No.: WO2010/104059
PCT Pub. Date: Sep. 16, 2010

(65) Prior Publication Data
US 2011/0316458 A1    Dec. 29, 2011

(30) Foreign Application Priority Data

Mar. 9, 2009  (JP) .................................. 2009-055299
Nov. 12, 2009 (JP) .................................. 2009-258996

(51) Int. Cl.
*H02P 21/00* (2006.01)

(52) U.S. Cl.
USPC ..................... 318/400.02; 318/432

(58) Field of Classification Search
CPC ........................................................ B26D 6/10
USPC ............................................. 318/400.02, 432
See application file for complete search history.

(56) References Cited

U.S. PATENT DOCUMENTS 6,002,234 A * 12/1999 Ohm et al. .................... 318/729
6,259,226 B1 * 7/2001 Kaitani et al. ............... 318/798

(Continued)

FOREIGN PATENT DOCUMENTS

JP    7-170799 A    7/1995
JP    8-322299 A    12/1996

(Continued)

OTHER PUBLICATIONS

International Search Report for PCT/JP2010/053848 mailed Jun. 15, 2010.

*Primary Examiner* — Erick Glass
(74) *Attorney, Agent, or Firm* — Sughrue Mion, PLLC (57) ABSTRACT

A three-phase motor control apparatus 4 controlling a driver which drives a three-phase motor includes: a desired rotation angle generation section 5 which generates a desired rotation angle; a rotation angle detector 2 which detects a detected rotation angle which is the rotation angle of said three phase motor; a feedback controller 6 which generates a q-axis command reference value which controls the q-axis voltage or the q-axis current of the three-phase motor 1 in response to the desired rotation angle and the detected rotation angle; a drive torque correction section and an adder 10 which generate a q-axis command value by correcting the q-axis command reference value; and a two-phase to three-phase transformation section 8 which generates a control signal which controls the driver circuit 3 which drives the three-phase motor in response to the q-axis command. The drive torque correction section 7 includes an angle look-up table 11 which contains elements respectively associated with angle ranges defined for the rotation angle of the three-phase motor, and selects any of the elements in response to the detected rotation angle. The q-axis command is generated by correcting the q-axis command reference value based on the value of the selected element.

17 Claims, 6 Drawing Sheets

(56) References Cited

U.S. PATENT DOCUMENTS 8,073,592 B2 * 12/2011 Nishimori et al. .............. 701/39
8,150,580 B2 * 4/2012 Suzuki ........................... 701/42

FOREIGN PATENT DOCUMENTS

| | | |
|---|---|---|
| JP | 9-215399 A | 8/1997 |
| JP | 11-332296 A | 11/1999 |
| JP | 3244744 B | 1/2002 |
| JP | 2004336949 A | 11/2004 |
| JP | 2005351981 A | 12/2005 |
| JP | 2006149176 A | 6/2006 |
| JP | 2007325408 A | 12/2007 |
| JP | 2008067516 A | 3/2008 |
| WO | 2005067137 A | 7/2005 |

* cited by examiner

THREE-PHASE MOTOR CONTROLLER, THREE-PHASE MOTOR SYSTEM, THREE-PHASE MOTOR CONTROL METHOD AND PROGRAM

TECHNICAL FIELD

The present invention relates to a three-phase motor controller, more particularly, to a technique for controlling a three-phase motor by using a vector control.

BACKGROUND ART

One method for controlling a three-phase motor to revolve at a desired angular velocity is the vector control. The vector control is a method in which a three-phase motor (such as, induction motors, synchronous motors and permanent magnet motors) is handled in the same way as a dc machine by representing the electrical status (such as, current and voltage) of the secondary winding with two separate components: the direct axis component (or d-axis component) and the quadrature axis component (or q-axis component), and controlling the individual components.

Figure 1:
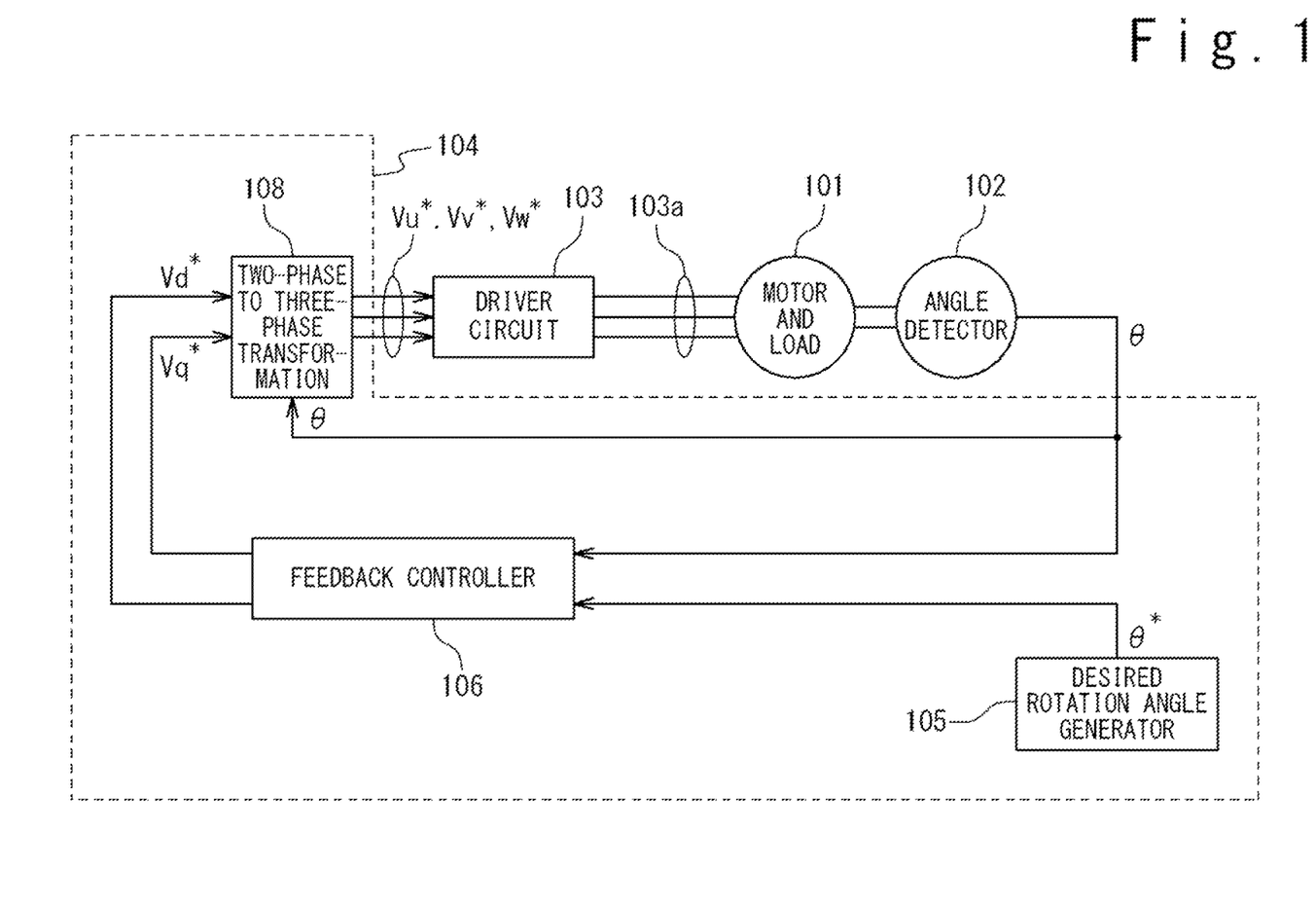
FIG. 1 is a block diagram showing a typical configuration of a three-phase motor system in which a three-phase motor is controlled with a vector control.

FIG. 1 is a block diagram showing a three-phase motor system including a three-phase motor control apparatus which performs a vector control on a three-phase motor on the basis of a d-q axis transformation. The three phase system of FIG. 1 includes a three-phase motor 101, an angle detector 102, a driver circuit 103 and a three-phase motor control apparatus 104. The three-phase motor control apparatus 104 includes a desired rotation angle generator 105, a feedback controller 106 and a two-phase to three-phase transformation section 108.

The operation of the three-phase motor system of FIG. 1 is schematically as follows: The rotation angle of the rotor of the three-phase motor 101 is detected by the angle detector 102. The rotation angle detected by the angle detector 102 is referred to as detected rotation angle θ, hereinafter. A desired value of the rotation angle of the rotor (desired rotation angle θ*) is generated by the desired rotation angle generator 105. The desired rotation angle θ* is generated so that the three phase motor 101, which is attached with a load, revolves at a desired angular velocity. The feedback controller 106 generates a d-axis command Vd* and a q-axis command Vq* by a feedback control in response to the desired rotation angle θ* and the detected rotation angle θ. Three-phase commands Vu*, Vv* and Vw* are generated by performing a two-phase to three-phase transformation on the d-axis command Vd* and the q-axis command Vq*, by the two-phase to three-phase transformation section 108. The driver circuit 103 is responsive to the three-phase commands Vu*, Vv* and Vw* for feeding three-phase power through three phase power lines 103a, to thereby drive three-phase motor 101. The three-phase motor system of FIG. 1, in which the feedback controller 106 performs a feedback control, such as a current control and a speed control, achieves the desired angular velocity.

Three-phase motor systems as shown in FIG. 1 are disclosed in various patent literatures. For example, Japanese Patent Gazette No. 3,244,144B (patent literature 1) discloses a configuration in which a PI control and a neural network are used for the feedback control. Japanese Patent Application Publication No. H09-215399 A (patent literature 2) discloses a configuration in which a speed control is performed as the feedback control to calculate the q-axis command. Furthermore, Japanese Patent Application Publication No. 2006-149176 A (patent literature 3) discloses that the feedback controller includes a current controller or speed controller as well as a repetition controller.

In addition, Japanese Patent Application Publication No. H07-170799 A (patent literature 4) discloses a technique for improving the preciseness of the control and avoiding torque ripple by correcting the error (the offset value or the non-linear error) in a current detector provided within a feedback control system. Furthermore, Japanese Patent Application Publication No. H08-322299 A (patent literature 5) discloses a technique for generating function values of trigonometric functions used in the feedback control with a reduced memory capacity. In addition, Japanese Translation of PCT Application No. WO2005/067137 (patent literature 6) discloses a technique for precisely calculating the rotation angle by correcting the detected value of the rotation angle (or the position).

One issue of the three-phase motor system shown in FIG. 1 is how to deal with the torque disturbance which is synchronous with the rotation of the rotor of the three-phase motor 101 (hereinafter, referred to as "rotation synchronous torque disturbance"). The torque may vary in synchronization with the rotation when there is an imbalance in the distribution of the moment of inertia with respect to the rotation center of the rotor of the three-phase motor 101, due to the offset with respect to the rotation center of the rotor shaft of the three-phase rotor and the like. In other words, the rotation of the rotor of the three-phase motor 101 is influenced by the rotation synchronous torque disturbance. Due to the rotation synchronous torque disturbance, the vector control results in that the rotation angle of the three-phase motor 101 is not identical to the desired rotation angle θ*. In other words, the angular velocity of the rotor of the three-phase motor 101 does not coincide with the desired angular velocity.

One approach for regulating the rotation angle of the three-phase motor 101 to the desired rotation angle θ* may be to set the control frequency range of the feedback control to be in a higher range, that is, to increase the operation frequency of the angle detector 102 and the three-phase control unit 104. This approach is however insufficient, since the actually achievable control frequency range is limited in view of the limitation of the sampling frequency of the angle detector 102 and the necessity of the prevention of the oscillation of the feedback system. When the rotation synchronous torque disturbance is increased whereas the control frequency range of the feedback control system is limited, the difference between the desired rotation angle and the detected rotation angle may become larger than an allowed maximum value.

CITATION LIST

Patent Literature

Patent literature 1: Japanese Patent Gazette No. 3,244,744
Patent literature 2: Japanese Patent Application Publication No. H09-215399 A
Patent literature 3: Japanese Patent Application Publication No. 2006-149176 A
Patent literature 4: Japanese Patent Application Publication No. H07-170799 A
Patent literature 5: Japanese Patent Application Publication No. H08-322299 A
Patent literature 6: Japanese Translation of PCT Application No. WO2005/067137

Patent literature 7: Japanese Patent Application Publication No. 2005-351981 A

DISCLOSURE OF INVENTION

An objective of the present invention is to provide a three-phase motor control technique which enables reducing the error of the actual rotation angle of the three-phase motor from the desired rotation angle by reducing the influence of the rotation synchronous torque disturbance, even when the control frequency range of the feedback control system is limited.

In an aspect of the present invention, a three-phase motor control apparatus controlling a driver which drives a three-phase motor includes: a desired rotation angle generation means for generating a desired rotation angle; a rotation angle detection means for detecting a detected rotation angle which is the rotation angle of the three phase motor; a q-axis command generation means for generating, in response to the desired rotation angle and the detected rotation angle, a q-axis command reference value which controls the q-axis voltage or the q-axis current of the three-phase motor; a drive torque correction means for generating a q-axis command value by correcting the q-axis command reference value; and a control signal generation means for generating a control signal which controls the driver which drives the three-phase motor in response to the q-axis command. The drive torque correction means includes an angle look-up table which contains values of elements respectively associated with angle ranges defined for the rotation angle of the three-phase motor, selects any of the elements in response to the detected rotation angle, and generates the q-axis command by correcting the q-axis command reference value based on the value of the selected element.

In another aspect of the present invention, a three-phase motor system includes: a three-phase motor; a driver driving the motor; a desired rotation angle generation means for generating a desired rotation angle; a rotation angle detection means for detecting a detected rotation angle which is the rotation angle of the three phase motor; a q-axis command generation means for generating, in response to the desired rotation angle and the detected rotation angle, a q-axis command reference value which controls the q-axis voltage or the q-axis current of the three-phase motor; a drive torque correction means for generating a q-axis command value by correcting the q-axis command reference value; and a control signal generation means for generating a control signal which controls the driver which drives the three-phase motor in response to the q-axis command. The drive torque correction means includes an angle look-up table which contains values of elements respectively associated with angle ranges defined for the rotation angle of the three-phase motor, selects any of the elements in response to the detected rotation angle, and generates the q-axis command by correcting the q-axis command reference value based on the value of the selected element.

In still another aspect of the present invention, a three-phase motor control method for controlling a three-phase motor includes steps of:

generating a desired rotation angle;
detecting a detected rotation angle which is the rotation angle of the three-phase motor;
generating, in response to the desired rotation angle and the detected rotation angle, a q-axis command reference value which controls the q-axis voltage or the q-axis current of the three-phase motor;
containing values of elements respectively associated with angle ranges defined for the rotation angle of the three-phase motor, in an angle look-up table;
selecting any of the elements in response to the detected rotation angle;
generating the q-axis command by correcting the q-axis command reference value based on the value of the selected element; and
driving the three-phase motor in response to the q-axis command.

In still another aspect of the present invention, a program recorded in a recording medium causes a digital controller to perform steps of:

detecting a detected rotation angle which is the rotation angle of the three-phase motor;
generating, in response to a desired rotation angle and the detected rotation angle, a q-axis command reference value which controls the q-axis voltage or the q-axis current of the three-phase motor;
containing values of elements respectively associated with angle ranges defined for the rotation angle of the three-phase motor, in an angle look-up table;
selecting any of the elements in response to the detected rotation angle;
generating the q-axis command by correcting the q-axis command reference value based on the value of the selected element; and
controlling a drive which drives the three-phase motor in response to the q-axis command.

BRIEF DESCRIPTION OF DRAWINGS

Objectives, effects and features of the above-described invention will be clarified by description of embodiments in cooperation with the attached drawings in which.

EMBODIMENTS OF INVENTION

In the following, a description is given of a three-phase motor unit in embodiments of the present invention, with reference to the drawings.

First Embodiment

Figure 2:
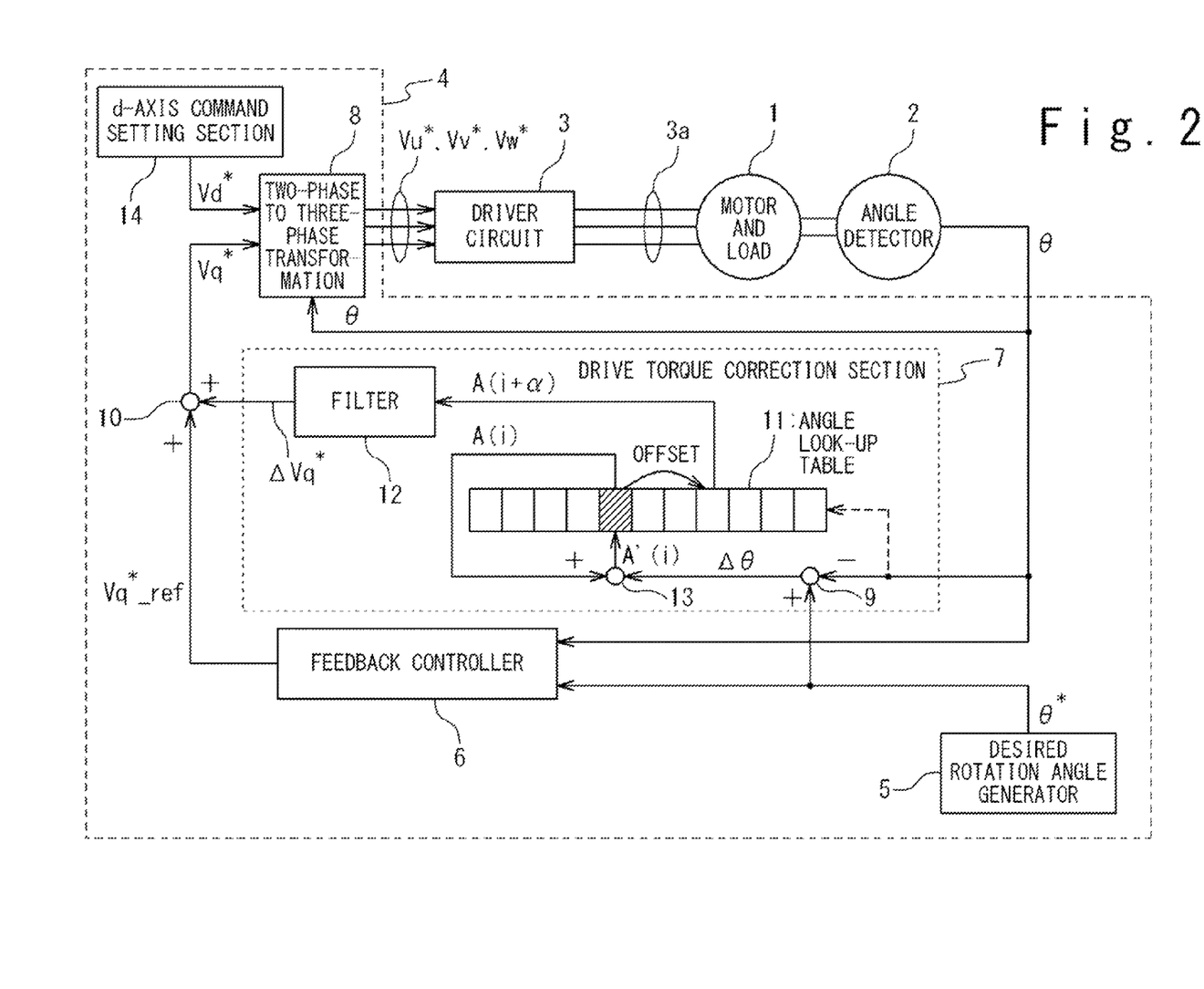
FIG. 2 is a block diagram showing the configuration of a three-phase motor system in a first embodiment of the present invention.

FIG. 2 is a diagram showing the configuration of a three-phase motor system including a three-phase motor control apparatus of a first embodiment. In this embodiment, the three-phase motor system includes a three-phase motor 1 which is attached with a load, an angle detector 2, a driver circuit 3 and a three-phase motor control apparatus 4.

The three-phase motor 1 operates on three-phase power received from the driver circuit 3 through three-phase power lines 3a. An induction motor or a synchronous motor (including a permanent magnet motor) may be used as the three-phase motor 1. The three-phase motor 1 is attached with a load, such as observation equipment. As described above, a rotation synchronous torque disturbance occurs in synchronization with the rotation of the rotor of the three-phase motor 1, when there is an imbalance in the distribution of the moment of inertia with respect to the rotation center of the shaft of the three-phase motor 1, due to the offset of the load attached to the three phase motor 1 with respect to the rotation center of the shaft of the three-phase motor 1.

The angle detector 2 detects the rotation angle of the rotor of the three-phase motor 1 at a predetermined sampling period. In the following, the rotation angle detected by the angle detector 2 is referred to as detected rotation angle $\theta$. For example, a resolver, an encoder, a magnetic sensor, a Hall element or the like is used as the angle detector 2.

The driver circuit 3 feeds the three-phase power to the three-phase motor 1 through the three-phase power lines 3a. The driver circuit 3 controls the currents through the three-phase power lines 3a so that the voltages of the respective phases of the three-phase power lines (the u-phase voltage Vu, the v-phase voltage Vv and the w-phase voltage Vw) are maintained at the values specified by the three-phase commands Vu*, Vv* and Vw* against the influence of the back electromotive force within the three-phase motor 1. The current control of the three-phase power lines 3a may be achieve by a PWM control, for example. In one embodiment, the driver circuit 3 is composed of a power supply and an analog circuit.

The three-phase motor control apparatus 3 includes a desired rotation angle generator 5, a feedback controller 6, a drive torque correction section 7, a two-phase to three-phase transformation section 8 and an adder 10. The three-phase motor control apparatus 4 generates the three-phase commands Vu*, Vv* and Vw*, which control the driver circuit 3, in response to the detected rotation angle $\theta$ detected by the angle detector 2. In the following, a detailed description is given of the configuration of the three-phase motor control apparatus 4.

The desired rotation angle generator 5 generates the desired rotation angle $\theta$ at each time from a desired angular velocity.

The feedback controller 6 generates a q-axis command reference value Vq*_ref to cause the detected rotation angle $\theta$ to track the desired rotation angle $\theta$*. In one embodiment, the feedback controller 6 includes a rate loop controller and a position loop controller. The rate loop controller includes a rate loop generator section which estimates the angular velocity and a rate loop compensation element section which provides a disturbance compensation so as to cause the angular velocity to track the desired angular velocity. The rate generator estimates the angular velocity of the three-phase motor 1 from the detected rotation angle $\theta$ by using a high-pass filter (a low frequency derivation). The rate loop compensation element section generates the q-axis command reference value Vq*_ref, which causes the detected rotation angle $\theta$ to track the desired rotation angle $\theta$*, by multiplying the angular velocity error (=[desired angular velocity]−[estimated angular velocity]) by a gain. The rate loop compensation element section also performs disturbance compensation in a low frequency range by using a lag-lead filter. The position loop controller receives the rotation angle error $\Delta\theta$ (=[desired rotation angle $\theta$*]−[detected rotation angle $\theta$]), generates a rate command by using an integrator and a lag-lead filter, and provides disturbance compensation in a frequency range lower than the loop frequency band by an integrator, while improving the stability of the control system by the lead-lag filter.

The drive torque correction section 7, on the other hand, generates a drive torque correction value $\Delta Vq^*$ in response to the detected rotation angle $\theta$. As described later, the drive torque correction value $\Delta Vq^*$ is a correction value which is used to correct the q-axis command reference value Vq*_ref to thereby generate the q-axis command Vq*. The configuration of the drive torque correction section 7 and the generation of the drive torque correction value $\Delta Vq^*$ will be described later in detail.

The signal adder 10 generates the q-axis command Vq* by adding the q-axis commend reference value Vq*_ref and the drive torque correction value $\Delta Vq^*$ together.

The d-axis command setting section 14 generates a d-axis command Vd*. The d-axis command Vd* is set to a constant value in accordance with the desired angular velocity of the three-phase motor 1. In other words, the d-axis command Vd* is kept constant as long as the setting of the desired angular velocity is unchanged. When the d-axis command Vd* is kept constant, the drive torque is proportional to the q-axis command Vq*; this achieves an optimized drive torque control, that is, an optimized calculation of the q-axis command Vq* with a simple circuit configuration and calculation.

The two-phase to three-phase transformation section 8 generates the three-phase commands Vu*, Vv* and Vw* by performing a two-phase to three-phase transformation on the d-axis command Vd* and the q-axis command Vq*. In one embodiment, the two-phase to three-phase transformation section 8 includes a phase reference signal calculator and a two-phase to three-phase transformer. The phase reference signal calculator generates a phase reference signal from the angular velocity calculated from the detected rotation angle $\theta$ and the desired angular velocity. The two-phase to three-phase transformer generates the three-phase commands Vu*, Vv* and Vw* by applying a coordinate transformation matrix to the d-axis command Vd* and the q-axis command Vq*. It should be noted that the angular velocity calculated in the feedback controller 6 may be used in the phase reference signal calculator of the two-phase to three-phase transformation section 8, instead of calculating the angular velocity used in the phase reference signal calculator from the detected rotation angle $\theta$ in the two-phase to three-phase transformation section 8. The three-phase commands Vu*, Vv* and Vw* are fed to the driver circuit 3 and used as control signals of the driver circuit 3.

Next, a description is given of the configuration of the drive torque correction section 7 and the generation of the drive torque correction value $\Delta Vq^*$ by the drive torque correction section 7. The drive torque correction section 7 includes an angle look-up table 11, a filter 12 and an adder 13. A subtractor 9 generates a rotation angle error $\Delta\theta$ by subtracting the detected rotation angle $\theta$ from the desired rotation angle $\theta$*.

The angle look-up table 11 is a table storing elements A(1) to A(m) which are used for the generation of the drive torque correction value $\Delta Vq^*$. The number m of the elements stored in the angle look-up table 11 is set to the value obtained by dividing one cycle by the product of a desired rotation frequency $\omega^*$ (Hz) and the sampling period T (s). When the desired revolving velocity is 60 rpm and the sampling period of the angle detector 2 is 10 ms, for example, the desired rotation frequency is 1 Hz and the number m of the elements is calculated by the following equation:

$$m = 1/(\omega^* \times T)$$
$$= 1/(1 \times 0.01)$$
$$= 100.$$

In this case, the angle look-up table 11 is structured as a table storing elements A(1) to A(100). Each element of the angle look-up table 11 is denoted by the element number i; the element associated with the element number i is element A(i).

Each element A(i) is associated to a specific angle range of the detected rotation angle θ. In the following, the angle range associated with the element A(i) is referred to as angle range #i. The angle ranges #1 to #m are determined so as to cover the entire range from 0° to 360°. When the number of the elements m is 100, for example, the angle range #1 to #m are determined in steps of 3.6° (=360°/100) as follows:

358.2°<θ≤1.8°: angle range #1 (associated with the element A(1))

1.8°<θ≤5.4°: angle range #2 (associated with the element A(2))

...

352.8°<θ≤358.2°: angle range #100 (associated with the element A(100))

The filter 12 generates the driver torque correction value ΔVq* by passing a specific frequency component of the value received from the angle look-up table 11 and removing the remaining frequency components. When the desired rotation frequency is 1 Hz, for example, the filter 12 is formed as a first-order low pass filter which removes high frequency components with a band width of 10 Hz.

The adder 13 calculates an update value A' (i) of the angle look-up table 11 in response to the detected rotation angle θ and the rotation angle error Δθ. As described later, the update value A' (i) is used to update the values of the angle look-up table 11.

In the drive torque correction section 7 as thus constructed, the drive torque correction value ΔVq* is generated by the following process: Every when the detected rotation angle θ is obtained, one of the elements A(1) to A(m) is selected in response to the detected rotation angle θ, and the value of the selected element is sent to the filter 12 from the angle look-up table 11. When the detected rotation angle θ falls into the angle range #i, the value of the element A(i+A) is sent to the filter 12. When i+α exceeds m, however, the value of the element (i+A−m) is sent to the filter 12. Here, α is an offset obtained by converting the delay of the control system, more specifically, the phase delay from the output of the angle look-up table 11 to the detection of the detected rotation angle θ, into the corresponding rotation angle. When the phase delay of the control system of the frequency of 1 Hz, which corresponds to the desired rotation velocity of 60 rpm, is 36°, the offset α is determined by the following equation:

$$\alpha = [\text{phase delay}]/360 \times m$$
$$= 36/360 \times 100 = 10.$$

The selection of the elements in accordance with the delay of the control system is effective for appropriately generating the drive torque correction value ΔVq*.

The driver torque correction value ΔVq* is calculated by the low-pass filtering by the filter 12 to remove high-frequency components. It should be noted that the low-pass filtering is not an essential process in terms of the principle of the present invention. It should be also noted that the low-pass filtering by the filter 12 is effective for stabilizing the control.

The element A(i) associated with the detected rotation angle θ is updated in parallel to the calculation of the drive torque correction value ΔVq*. In detail, when the detected rotation angle θ falls into the angle range #1, the update value A' (i) is calculated as the sum of the element A(i) and the rotation angle error Δθ, and the element A(i), which is associated with the angle range #i, is updated to the update value A' (i). Updating the element A(i) in this manner results in that the value of the element A(i) is the integrated value obtained by accumulating the rotation angle errors Δθ which are calculated in the past for the case when the rotation angle of the three-phase motor 1 falls into the angle range #i.

In the three-phase motor system of this embodiment, the rotation angle error Δθ is reduced by generating the q-axis command Vq* by correcting the q-axis command reference value Vq*_ref with the drive torque correction value ΔVq* thus generated. An significant point in such control is that the drive torque correction value ΔVq* is determined depending on the detected rotation angle θ. Determining the drive torque correction value ΔVq* depending on the detected rotation angle θ is effective for reducing the influence of the rotation synchronous torque disturbance generated in synchronization with the rotation of the three-phase motor 1. When the rotation angle error Δθ is increased at a specific detected rotation angle θ, for example, the q-axis command Vq* is generated by using the drive torque correction value ΔVq*, which is determined depending on the detected rotation angle θ; this reduces the rotation angle error Δθ.

As thus described, the three-phase motor system of this embodiment reduces the rotation angle error Δθ, reducing the influence of the rotation synchronous torque disturbance.

Second Embodiment

Figure 3:
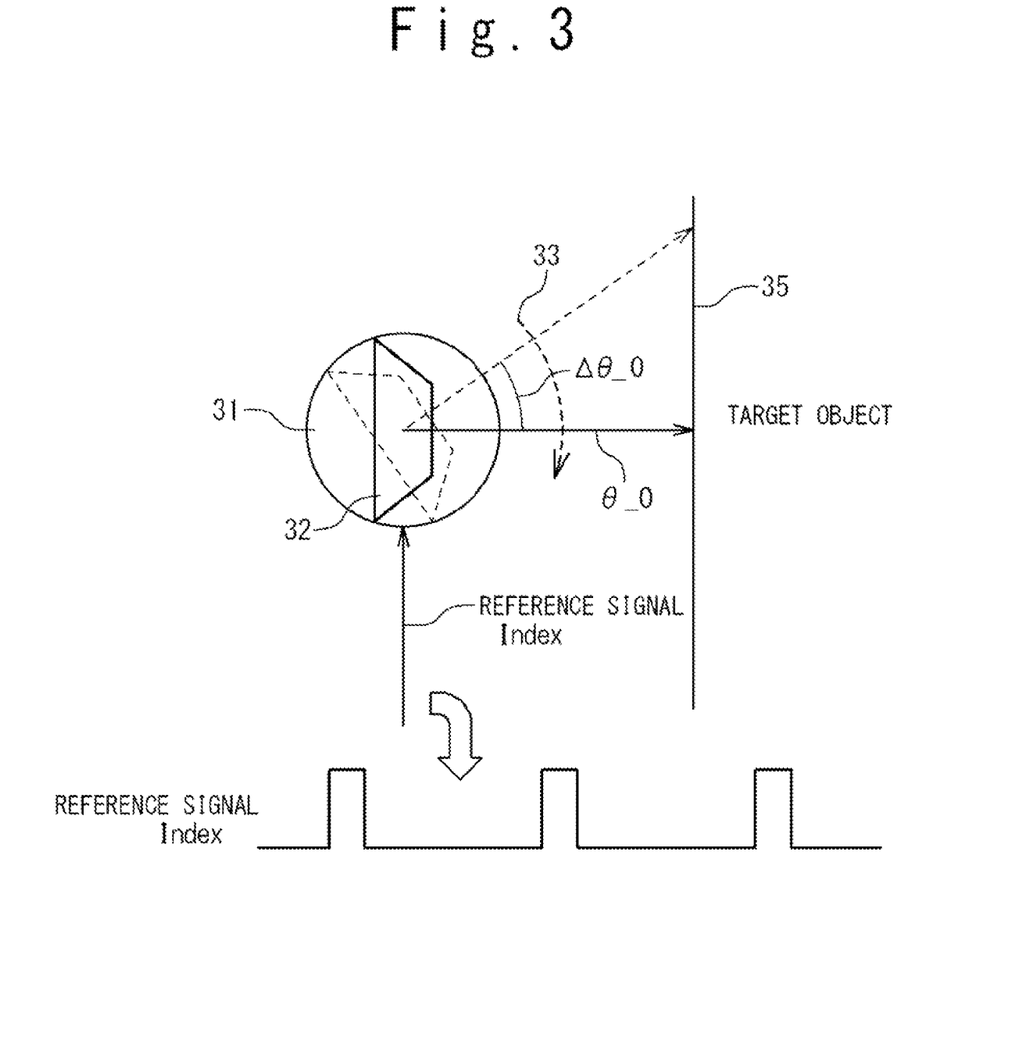
FIG. 3 is a block diagram showing the configuration of a scanner apparatus to which a three-phase motor system of a second embodiment of the present invention is applied.

In a second embodiment, as shown in FIG. 3, the present invention is applied to a scanner apparatus configured to scan a target object with a rotating body (load) 32 attached with a three-phase motor 31. The three-phase motor system shown in FIG. 3 is configured to rotate the rotating body 32 attached with the three-phase motor 31 in a rotating direction 33 at a constant angular velocity desired (or the rated angular velocity).

In the three-motor system of the second embodiment, differently from the first embodiment, the three-phase motor 31 is controlled so that the rotating body 32 is rotated in synchronization with a reference signal Index; the three-phase motor control apparatus 4 of the first embodiment is not configured to synchronize the rotation of the three-phase motor 31 with the reference signal Index. In detail, in the second embodiment, the three-phase motor 31 is controlled so that the rotating body 32 is directed toward a specific position on the target object 35, that is, the rotation angle of the three-phase motor 31 becomes a predetermined reference angle θ_0, when the reference signal Index is asserted. In order to achieve such operation, the configuration and operation of the three-phase motor control apparatus 4 are modified in the second embodiment, so that the three-phase motor 31 revolves in synchronization with the reference signal Index. It should be noted that a method for controlling the rotation angle of a rotating body in synchronization with a reference signal is disclosed in Japanese Patent Application Publication No. 2005-351981A (patent literature 7). In patent literature 7, a configuration is disclosed in which the control gain is modified in response to the difference between the phase at which the rotation angle of the rotating body is set to a predetermined reference position and the phase of the reference signal.

Figure 4:
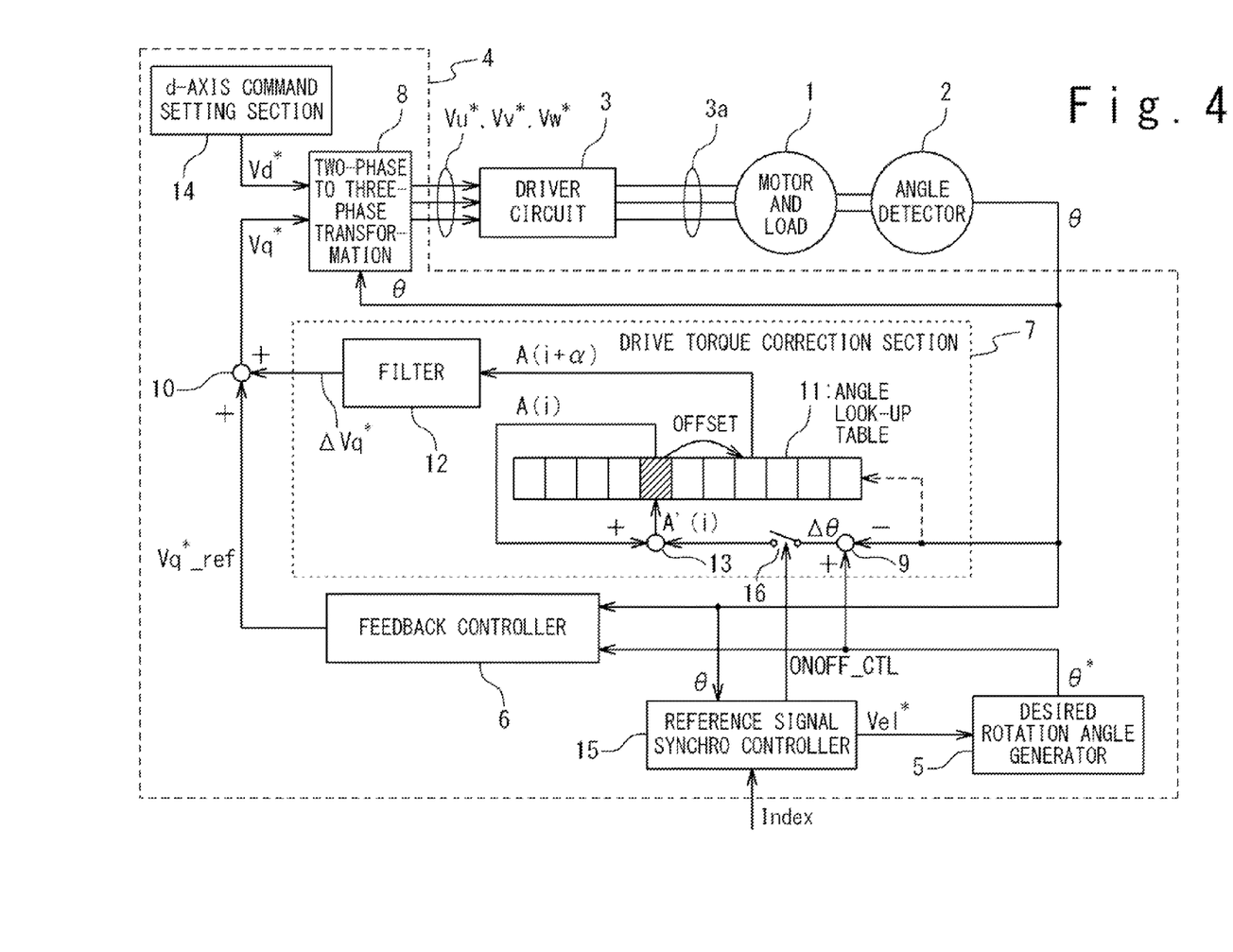
FIG. 4 is a block diagram showing the configuration of the three-phase motor system in the second embodiment of the present invention.

FIG. 4 is a block diagram showing the configuration of the three-phase motor system in the second embodiment. The configuration of the three-phase motor system of the second embodiment is similar to that of the first embodiment; the difference is that a reference signal synchro controller 15 is added to the three-phase motor controller 4 and an angle look-up table on-off switch 16 is added to the drive torque correction section 7. The reference signal synchro controller 15 performs a control for synchronizing the rotation angle of the rotor of the three-phase motor 31. The angle look-up table on-off switch 16 is a switch used for switching update or non-update of the angel reference table 11 provided in the drive torque correction section 7. The role and operation of the angle look-up table on-off switch 16 will be described later.

In order to achieve synchronization between the rotation angle of the rotor and the reference signal Index, the reference signal synchro controller 15 controls the angular velocity of the rotor of the three-phase motor 31. More specifically, the reference signal synchro controller 15 calculates the error $\Delta\theta\_0$ between the reference angle $\theta\_0$ and the detected rotation angle $\theta$ at each timing when the reference signal Index is asserted. The reference signal synchro controller 15 decreases the desired angular velocity Vel* below the rated angular velocity $V_{RATED}$ when the detected rotation angle $\theta$ is leading from the reference angle $\theta\_0$, and increases the desired angular velocity Vel* above the rated angular velocity $V_{RATED}$ when the detected rotation angle $\theta$ is lagging behind the reference angle $\theta\_0$. By such control, the reference signal controller 15 regulates the detected rotation angle $\theta$ at each timing when the reference signal Index is asserted toward the reference angle $\theta\_0$. The desired angle generator 5 generates the desired rotation angle $\theta*$ on the basis of the desired angular velocity Vel* (by integrating the desired angular velocity Vel*, in detail).

One issue is that the error between the desired rotation angle $\theta*$ and the rotation angle of the rotating body 32 may increase, when a control for changing the angular velocity of the rotor of the three-phase motor 31 and the correction of the q-axis command Vq* using the angle look-up table 11 are performed at the same time. This results from that the angle look-up table 11 accumulates changes in the rotation angle error $\Delta\theta$ caused by changing the angular velocity. In order to properly generate the drive torque correction value $\Delta Vq*$, it is desirable to remove the influence of the changes in the rotation angle error $\Delta\theta$ caused by changing the angular velocity, from the value accumulated in each element A(i) of the angle look-up table 11.

The angle look-up table on-off switch 16 is provided to remove the influences of the changes in the rotation angle error $\Delta\theta$ caused by changing the angular velocity, from the values accumulated in the angle look-up table 11. When the angular velocity is set to the rated angular velocity $V_{RATED}$, the angle look-up table on-off switch 16 is turned on. In this case, the rotation angle error $\Delta\theta$ is set to the value obtained by subtracting the detected rotation angle $\theta$ from the desired rotation angle $\theta*$. When the angular velocity is changed from the rated angular velocity $V_{RATED}$, on the other hand, the angle look-up table on-off switch 16 is turned off. In this case, the rotation angle error $\Delta\theta$ is set to zero. This results in that the update value A'(i) of the angle look-up table 11 becomes coincident with the original element A(i) to stop the update of the angle look-up table 11.

In the following, a description is given of the configuration and operation of the external reference signal synchro controller 15. The reference signal synchro controller 15 generates the desired angular velocity Vel*. In one embodiment, the reference signal synchro controller 15 includes a reference angle error calculation section, a desired angular velocity generation section and an angle look-up table control section. The reference angle error calculation section calculates a reference angle error $\Delta\theta\_0$ which is the difference between the reference angle $\theta\_0$ and the detected rotation angle $\theta$ at the timing when the reference signal Index is asserted. It should be noted that the reference angle $\theta\_0$ is a predetermined value provided in advance, and indicates the angle in which the rotating body 32 is to be directed at the timing when the reference signal Index is asserted. The desired angular velocity generation section sets the desired angular velocity Vel* to the predetermined rated angular velocity $V_{RATED}$, when the reference angle error $\Delta\theta\_0$ is in a predetermined range, more specifically, when the absolute value of the reference angle error $\Delta\theta\_0$ is smaller than a predetermined setting value $\theta_{LMT}$. Here, the rated angular velocity $V_{RATED}$ is set to 360°/Tindex in this embodiment, where Tindex is the cycle period at which the reference signal Index is asserted. When the absolute value of the reference angle error $\Delta\theta\_0$ is larger than the predetermined setting value $\theta_{LMT}$, the desired angular velocity generation section sets the desired angular velocity Vel* to a value which depends on the reference angle error $\Delta\theta\_0$. In one embodiment, the desired angular velocity Vel* is set to a predetermined value larger than the rated angular velocity $V_{RATED}$ when $\Delta\theta\_0$ ($=\theta-\theta\_0$)>$\theta_{LMT}$, and the desired angular velocity Vel* is set to another predetermined value smaller than the rated angular velocity $V_{RATED}$ when $\Delta\theta\_0$ ($=\theta-\theta\_0$)<$\theta_{LMT}$.

Also, the angle look-up table control section asserts the angle look-up table on-off signal ONOFF_CTL when the absolute value of the reference angle error $\Delta\theta\_0$ is smaller than the setting value $\theta_{LMT}$, and otherwise negates the angle look-up table on-off signal ONOFF_CTL. When the angle look-up table ONOFF_CTL is asserted, the angle look-up table on-off switch is turned on to allow update of the contents of the angle look-up table 11. When the angle look-up table on-off signal ONOFF_CTL is negated, on the other hand, the angle look-up table on-off switch 16 is turned off to keep the contents of the angle look-up table 11 unchanged.

Figure 5:
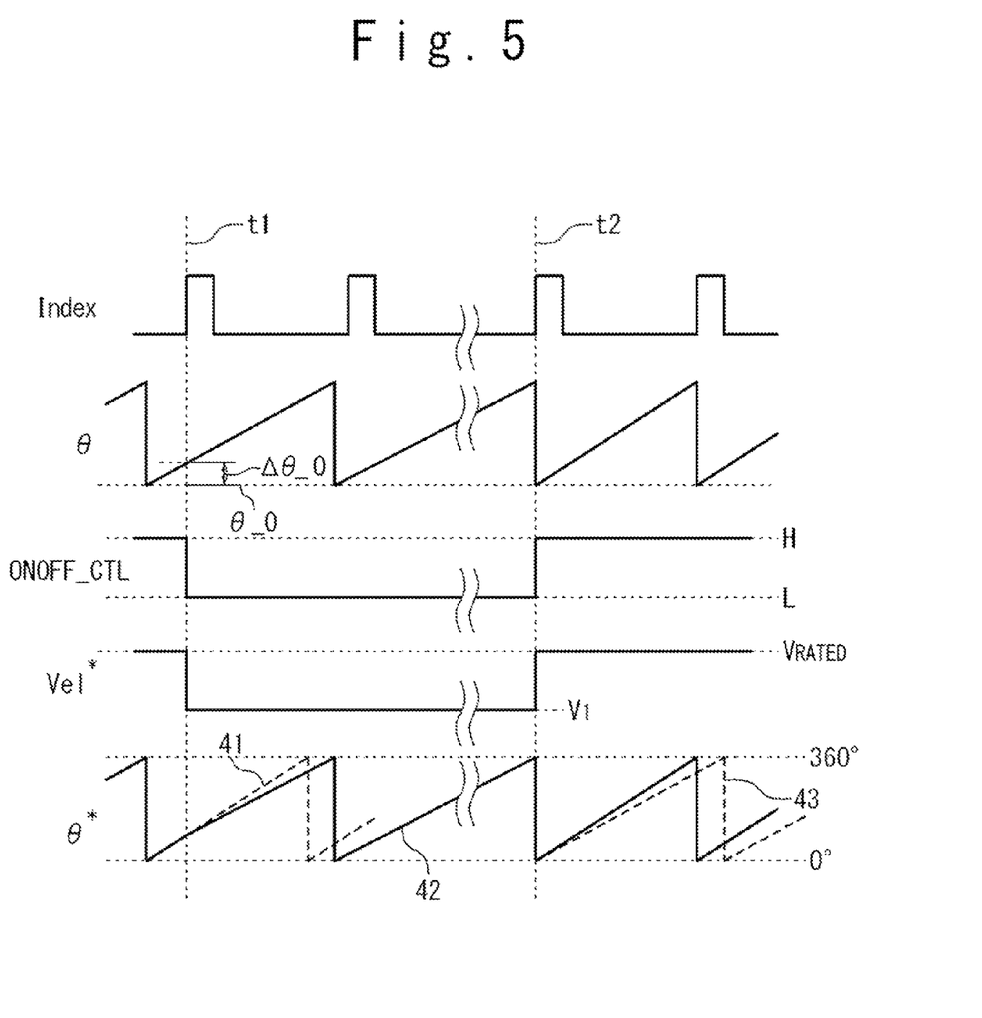
FIG. 5 is a timing chart showing one example of the operation of the three-phase motor system of the second embodiment.

FIG. 5 is a timing chart showing one example of the operation of the motor system in the present invention; FIG. 5 shows the changes in the reference signal Index, the detected rotation angle $\theta$, the angle look-up table on-off signal ONOFF_CTL, the desired angular velocity Vel* and the desired rotation angle $\theta*$.

The reference signal Index is asserted at predetermined time intervals. Each when the reference signal Index is asserted, the reference angle error $\Delta\theta\_0$, which is the difference between the detected rotation angle $\theta$ and the reference angle $\theta\_0$, is calculated, and the angle look-up table on-off signal ONOFF_CTL and the desired angular velocity Vel* are set in accordance with the calculated reference angle error $\Delta\theta\_0$.

More specifically, the absolute value of the reference angle error $\Delta\theta\_0$ is larger than the setting value $\theta_{LMT}$ at time t1 when the reference signal Index is asserted. In this case, the angle look-up table on-off signal ONOFF_CTL is negated (set to the "L" level in FIG. 5), and the desired angular velocity Vel* is set to a value which depends on the reference angle error $\Delta\theta\_0$. In the operation shown in FIG. 5, the desired angular velocity Vel* is set to an angular velocity $V_1$, which is lower than the rated angular velocity $V_{RATED}$. This results in that the desired rotation angle θ* is switched from the desired rotation angle track 41 corresponding to the rated angular velocity $V_{RATED}$ to the desired rotation angle track 42 corresponding to the angular velocity $V_1$, after time t1. The reference angle error Δθ_0 is decreased by setting the desired angular velocity Vel* is set to the angular velocity $V_1$, which is lower than the rated angular velocity $V_{RATED}$.

In the meantime, the angle look-up table 11 is not updated, since the angle look-up table on-off signal ONOFF_CTL is negated. This avoids the problem in which the angle look-up table 11 may accumulate the changes in the rotation angle error Δθ (=θ*−θ), when the reference angle error Δθ_0 is inappropriately increased.

Subsequently, at time t2, the reference angle error Δθ_0 becomes smaller than the setting value $θ_{LMT}$ at the timing when the reference signal Index is asserted. In FIG. 5, the reference angle error Δθ_0 is zero at time t2. In this case, the angle look-up table on-off signal ONOFF_CTL is asserted (set to the "H" level in FIG. 5), and the desired angular velocity Vel* is set to the rated angular velocity $V_{RATED}$. This results in that the desired rotation angle θ* is switched from the desired rotation angle track 43 corresponding to the angular velocity $V_1$ to the desired rotation angle track 42 corresponding to the rated angular velocity $V_{RATED}$.

After time t2, the angel reference table 11 is updated with the angle look-up table on-off signal ONOFF_CTL asserted, and the rotation angle error Δθ is accumulated into each element of the angle look-up table 11. The rotation angle error Δθ can be reduced by determining the drive torque correction value ΔVq* by using the angle look-up table 11 and correcting the q-axis command Vq* by using the drive torque correction value ΔVq*.

Figure 6:
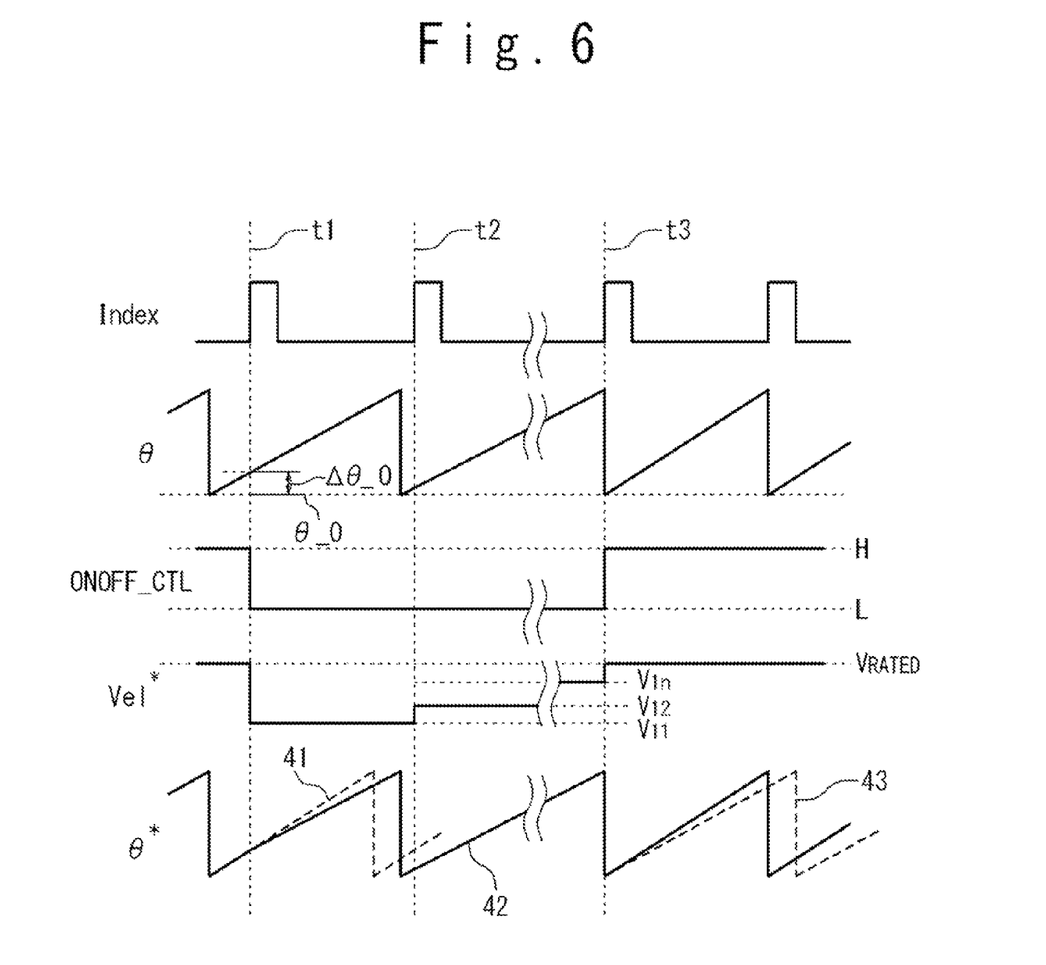
FIG. 6 a timing chart showing another example of the operation of the three-phase motor system of the second embodiment.

FIG. 6 is a timing chart showing another example of the operation of the motor system in this embodiment; FIG. 6 shows changes in the reference signal Index, the detected rotation angle θ, the angle look-up table on-off signal ONOFF_CTL, the desired angular velocity Vel* and the desired rotation angle θ*. In the operation shown in FIG. 6, the desired angular velocity Vel* is changed stepwise in response to the reference angle error Δθ_0, when the reference angle error Δθ_0 is larger than the setting value $θ_{LMT}$ at the timing when the reference signal Index is asserted. More specifically, the reference angle error Δθ_0 is larger than the setting value $θ_{LMT}$ at time t1, and therefore the desired angular velocity Vel* is set to an angular velocity V11, which is lower than the rated angular velocity $V_{RATED}$. Subsequently, the desired angular velocity Vel* is set to an angular velocity $V_{12}$, which is lower than the rated angular velocity $V_{RATED}$ and higher than the angular velocity $V_{11}$ at time t2, when the reference signal Index is asserted. This is followed by increasing the desired angular velocity Vel* up to the angular velocity $V_{1n}$ stepwise in the same manner, each when the reference signal Index is asserted. At time t3 when the reference signal Index is asserted, the absolute value of the reference angle error Δθ_0 becomes smaller than the setting value $θ_{LMT}$, and the desired angular velocity Vel* is set to the rated angular velocity $V_{RATED}$.

It should be noted that, although the desired angular velocity Vel* is changed at the timings when the reference signal. Index is asserted in FIG. 6, the desired angular velocity Vel* may be changed at a timing between the timings when the reference signal Index is asserted.

In the three-phase motor system of this embodiment, the desired angular velocity Vel* is generated in response to the reference angle error Δθ_0 at the timings when the reference signal Index is asserted, and the update of the angle look-up table 11 is stopped when the absolute value of the reference angle error Δθ_0 is large. The q-axis command Vq* is generated by correcting the q-axis command reference value Vq*_ref by using the drive torque correction value ΔVq* thus generated, and thereby the deterioration of the rotation angle error Δθ is suppressed, while the synchronization with the reference signal Index is achieved. An important point in such control is that, in accordance with the reference angle error Δθ_0, the desired angular velocity Vel* is determined and the angle look-up table on-off switch 16 is set. The fact that the update value A' (i) of the angle look-up table is determined in response to the reference angle error Δθ_0 is effective for suppressing the influence caused by the changes in the rotation angle error Δθ in achieving the synchronization with the reference signal Index. When the rotation angle error Δθ is transiently increased upon switching the desired angular velocity Vel*, for example, the convergent time of the control system is reduced by not reflecting the changes in the angle error to the angle look-up table 11, after the deterioration of the rotation angle error Δθ occurs after the synchronization with the reference signal Index is once achieved.

It should be noted that, the present invention may be implemented with various modifications apparent to the person skilled in the art, although specific embodiments of the present invention are described above. In the above-described embodiment, for example, the three-phase motor control apparatus 4 may be implemented as hardware composed of the above-described blocks. Alternatively, the functions of the respective blocks of the three-phase motor control apparatus 4 may be achieved by software. In one embodiment, for example, the three-phase motor control apparatus 4 may be implemented as a digital, controller which performs numerical calculations with software. In this case, a software program which achieves the functions of the respective blocks is installed on a processing apparatus used as a digital controller. In one embodiment, a recording medium is used for this installation.

In the above-described embodiment, the commands of the d-axis voltage, the q-axis voltage and the three-phase voltages (the u-phase voltage, the v-phase voltage and the w-phase voltage) are used as the d-axis command, the q-axis command and the three-phase commands in the above-described embodiment; alternatively, the commands of the d-axis current, the q-axis current and the three-phase currents (the u-phase current, the v-phase current and the w-phase current) may be used as the d-axis command, the q-axis command and the three-phase commands.

The present invention effectively reduces the error of the actual rotation angle of the three-phase motor from the desired rotation angle, overcoming the limitation of the control frequency range of the feedback control system.

Although the present invention is described above with reference to the above embodiments, the present invention is not limited to the above embodiments. The configuration and details of the present invention may be variously changed within the scope of the present invention, which are understood by the person skilled in the art.

The present application claims the priority based on Japanese Patent Application Nos. 2009-055299 and 2009-258996, the disclosures of which are incorporated herein by reference.

The invention claimed is:

1. A three-phase motor control apparatus controlling a driver which drives a three-phase motor, said apparatus comprising:
   a desired rotation angle generation section generating a desired rotation angle;

a rotation angle detection section detecting a detected rotation angle which is a rotation angle of said three phase motor;

a q-axis command generation section generating, in response to said desired rotation angle and said detected rotation angle, a q-axis command reference value which controls a q-axis voltage or a q-axis current of said three-phase motor;

a drive torque correction section generating a q-axis command value by correcting said q-axis command reference value; and a control signal generation section generating a control signal which controls said driver which drives said three-phase motor in response to said q-axis command, wherein said drive torque correction section includes an angle look-up table which contains values of elements respectively associated with angle ranges defined for the rotation angle of said three-phase motor, selects any of said elements in response to said detected rotation angle, and generates said q-axis command by adding a value of said selected element and said q-axis command reference value.

2. The three-phase motor control apparatus according to claim 1, wherein the values of said elements respectively associated with said angle ranges are accumulation values obtained by accumulating said rotation angle error calculated in the past for respective cases when said detected rotation angle of said three-phase motor falls into said respective angle ranges.

3. The three-phase motor control apparatus according to claim 1, wherein said drive torque correction section selects any of said elements in response to a phase delay of a control system from an output of said selected element from said angle look-up table to detection of said detected rotation angle, in addition to said detected rotation angle.

4. The three-phase motor control apparatus according to claim 1, wherein said drive torque correction section calculates said drive torque correction value by performing a filtering on the value of said selected element, and generates said q-axis command by correcting said q-axis command reference value with said drive torque correction value.

5. The three-phase motor control apparatus according to claim 1, wherein said d-axis command setting section sets said d-axis command to a constant value depending on a desired angular velocity of said three-phase motor.

6. The three-phase motor control apparatus according to claim 1, further comprising:

a reference signal synchro control section generating a desired angular velocity in synchronization with a reference signal fed from an external entity of said three-phase motor control apparatus, wherein said desired rotation angle generation section generates the desired rotation angle in response to said desired angular velocity, wherein said reference signal synchro control section generates said desired angular velocity in response to a reference angle error which is a difference between said detected rotation angle and a predetermined reference angle at a timing when said reference signal is asserted, and wherein said drive torque correction section is responsive to said reference angle error for updating or not updating said elements of said angle look-up table.

7. The three-phase motor control apparatus according to claim 6, wherein, when said reference angle error is in a predetermined range at a timing when said reference signal is asserted, said reference signal synchro control section sets said desired angular velocity to a rated angular velocity which is synchronous with time intervals at which said reference signal is asserted, and wherein, when said reference angle error is out of said predetermined range, said reference signal synchro control section sets said desired angular velocity to an angular velocity different from said rated angular velocity.

8. A three-phase motor system, comprising:

a three-phase motor;

a driver driving said motor; and a three-phase motor control apparatus configured to generate a desired rotation angle, to detect a detected rotation angle which is a rotation angle of said three phase motor, to generate, in response to the desired rotation angle and the detected rotation angle, a q-axis command reference value which controls the q-axis voltage or the q-axis current of the three-phase motor, to generate a q-axis command value by correcting said q-axis command reference value, and to generate a control signal which controls the driver which drives said three-phase motor in response to said q-axis command, wherein a three-phase motor control apparatus includes an angle look-up table which contains elements respectively associated with angle ranges defined for a rotation angle of said three-phase motor, selects any of said elements in response to said detected rotation angle, and generates said q-axis command by adding a value of said selected element and said q-axis command reference value.

9. The three-phase motor system according to claim 8, wherein said three-phase motor control apparatus is configured to generate a desired angular velocity in synchronization with a reference signal fed from an external entity of said three-phase motor control apparatus, wherein said three-phase motor control apparatus generates the desired rotation angle in response to said desired angular velocity, wherein said three-phase motor control apparatus generates said desired angular velocity in response to a reference angle error which is a difference between said detected rotation angle and a predetermined reference angle at a timing when said reference signal is asserted, and wherein said three-phase motor control apparatus is responsive to said reference angle error for updating or not updating said elements of said angle look-up table.

10. A three-phase motor control method for controlling a three-phase motor includes steps of:

generating a desired rotation angle;

detecting a detected rotation angle which is the rotation angle of the three-phase motor;

generating, in response to said desired rotation angle and said detected rotation angle, a q-axis command reference value which controls a q-axis voltage or a q-axis current of said three-phase motor;

containing elements respectively associated with angle ranges defined for the rotation angle of said three-phase motor, in an angle look-up table;

selecting any of said elements in response to said detected rotation angle;

generating said q-axis command by adding a value of said selected element and said q-axis command reference value; and driving said three-phase motor in response to said q-axis command.

11. The three-phase motor control method according to claim 10, further comprising:

in synchronization with a reference signal fed from an external entity, generating a desired angular velocity in response to a reference angle error which is a difference between said detected rotation angle and a predetermined reference angle at a timing when said reference signal is asserted; and updating said elements of said angle look-up table, wherein said desired rotation angle is generated in response to said desired angular velocity, and wherein the update of said elements of said angle look-up table is responsive to said reference angle error for being performed or not being performed.

12. A non-transitory recording medium recording a program which when executed causes a digital controller for a three phase motor to perform steps of:

generating by the digital controller, a desired rotation angle;

detecting by the digital controller, a detected rotation angle which is the rotation angle of the three-phase motor;

generating by the digital controller, in response to said desired rotation angle and said detected rotation angle, a q-axis command reference value which controls a q-axis voltage or a q-axis current of said three-phase motor;

containing by the digital controller, elements respectively associated with angle ranges defined for the rotation angle of said three-phase motor, in an angle look-up table;

selecting by the digital controller, any of said elements in response to said detected rotation angle;

generating by the digital controller, said q-axis command by adding a value of said selected element and said q-axis command reference value; and driving said three-phase motor in response to said q-axis command.

13. The non-transitory recording medium according to claim 12, wherein the program further causes said digital controller to perform steps of:

in synchronization with a reference signal fed from an external entity, generating a desired angular velocity in response to a reference angle error which is a difference between said detected rotation angle and a predetermined reference angle at a timing when said reference signal is asserted; and updating said elements of said angle look-up table, wherein said desired rotation angle is generated in response to said desired angular velocity, and wherein the update of said elements of said angle look-up table is responsive to said reference angle error for being performed or not being performed.

14. The three-phase motor system according to claim 8, wherein the values of said elements respectively associated with said angle ranges are accumulation values obtained by accumulating said rotation angle error calculated in the past for respective cases when said detected rotation angle of said three-phase motor falls into said respective angle ranges.

15. The three-phase motor system according to claim 8, wherein said three-phase motor control apparatus selects any of said elements in response to a phase delay of a control system from an output of said selected element from said angle look-up table to detection of said detected rotation angle, in addition to said detected rotation angle.

16. The three-phase motor system according to claim 8, wherein said three-phase motor control apparatus' calculates said drive torque correction value by performing a filtering on the value of said selected element, and generates said q-axis command by correcting said q-axis command reference value with said drive torque correction value.

17. The three-phase motor control apparatus according to claim 8, wherein said three-phase motor control apparatus sets said d-axis command to a constant value depending on a desired angular velocity of said three-phase motor.

* * * * *